Patented Nov. 16, 1943

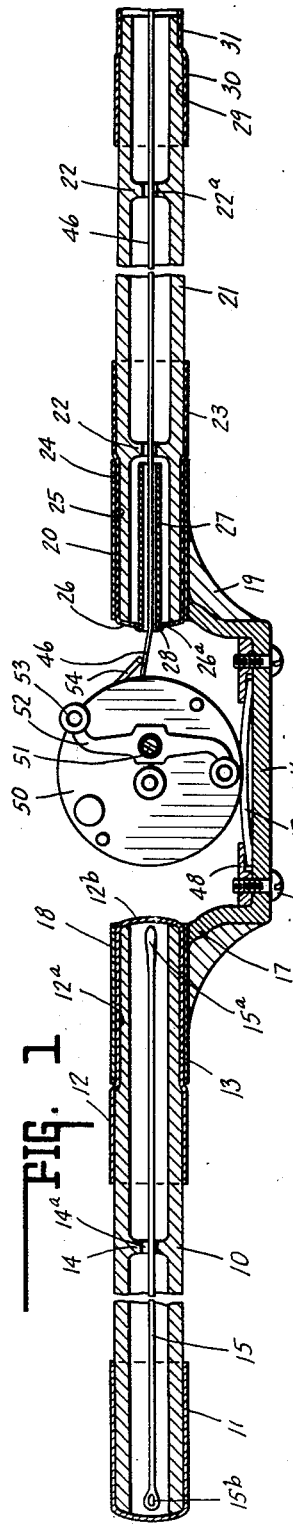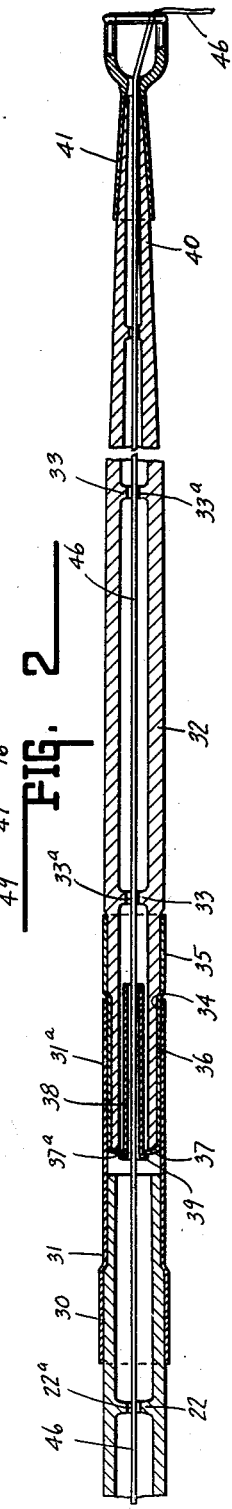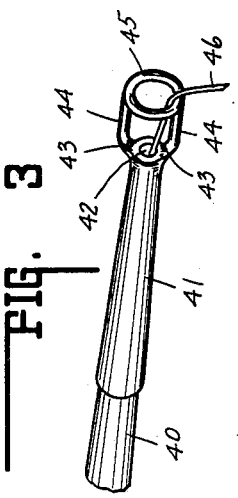

2,334,646

UNITED STATES PATENT OFFICE 2,334,646

GUIDELESS JOINTED CANE FISHING POLE

Russell C. Price, Frankfort, Ind.

Application December 10, 1942, Serial No. 468,466

13 Claims. (Cl. 43—18)

This invention relates to a cane, bamboo or like fishing pole.

The chief object of this invention is to eliminate the external eye guides on a fishing pole wherein the line is carried back from the tip to the handle and which in most instances is of reel supporting type, such elimination preventing line entanglement, knotting, snarling and the like.

Another chief object of this invention is to incorporate the invention in a comparatively long pole which is of separable sectional character.

The chief feature of the present invention is the substantially coaxial mounting of the line within the pole and from tip to reel or handle.

Another feature of the invention resides in the line supporting tip and the coaxial mounting of the line therein.

A further feature of the invention resides in the storage compartment type handle for bodkin storage.

Still a further feature of the invention resides in the mounting of a reel in offset relation in a pole and in juxtaposition to a coaxial opening therein in which is positioned the line to be fed from the reel to the tip.

A still further feature of the invention resides in the line guiding joint structure between detachable pole sections.

Other objects and features of the invention will be set forth more fully hereinafter.

The full nature of the invention will be understood from the accompanying drawing, the following description and claims:

In the drawing

Fig. 1 is a longitudinal central sectional view of the rear portion of a reel equipped cane pole embodying the invention, the bodkin, reel, line and reel base being shown in side elevation.

Fig. 2 is a similar view of the forward portion of the pole embodying the invention.

Fig. 3 is a perspective view of the tip end of the pole.

In Fig. 1, 10 indicates the handle section of a jointed cane pole structure. A cup-like closure 11 closes the rear end of portion 10 and same is functionally seated in said closure. The portion 10 includes a joint, or node 14 which is centrally apertured at 14a, and seated in portion 10 is bodkin 15 having at one end the eye 15b for line connection and at the other end head 15a. The length of bodkin 15 is about 12 to 15 inches and hence is sufficient to simultaneously project beyond two adjacent nodes in the cane pole.

The forward end of handle 10 is reduced to seat in reduced portion 12a of tubular member 12, the portion being closed at 12b for preventing bodkin loss from the handle storage compartment.

A generally U-shaped bracket 16 has a rearward upwardly extending, webbed arm 17 and a similarly webbed forward arm 19. Tube 18 is rigid with arm 17 and telescopically seats with the frictionally contact portion 12a of member 12 and the handle 10 secured thereto. A similar tube 20 is rigid with arm 19 and is aligned with tube 18. The tubes extend oppositely as shown.

A cane body portion 21 with nodes 22 each apertured at 22a has its rearward end reduced at 25 to rigidly mount the reduced end portion 24 of tubular member 23. Portion 24 has a closed end 26 apertured at 26a in alignment with node apertures 22a. A smaller tube 27 of appreciable length has a laterally directed flange 28. When tube 27 is friction seated in aperture 26a flange 28 abuts end 26. This structure provides an elongated guide for line 46, as well as bodkin 15 when the line is to be passed through the pole.

Confronting plates 48, secured by screws 49, are recessed as shown to receive the opposite ends of base 47 of the reel having frame 50, guard and guide 54, operating shaft 51, and hand lever 52 with handles 53. Thus the reel may be detachably clamped to the U-shaped structure so that the line 46 feeds directly from the reel to tube 27 and vice versa in the paying-out or reeling in of the line 46.

The forward end of cane section 21 is reduced and the tube 31 projects beyond that end as shown at 31a and most clearly in Fig. 2. Portion 30 is enlarged and is rigid with sleeve portion 31 and envelopes portion 29 of cane section 21 adjacent the reduced end thereof.

The forward section 32 of the cane pole includes nodes or joints 33 axially apertured at 33a for line and bodkin passage therethrough. The rearward end of section 32 is reduced at 34 and same is embraced by the reduced tubular portion 36 of tube or ferrule 35. The rear end is closed at 37 and this end is apertured at 37a to frictionally seat elongated smaller tube 38 having flange 39 bearing on end closure 37. The extended portion 31a telescopically and frictionally receives the reduced tubular portion 36 and the joint between pole sections is completed with all apertures in alignment.

Reference will now be had to the right hand portion of Fig. 2 and Fig. 3. Cane section 32 adjacent the tip is externally reduced by tapering as at 40 so that it may be wedged into the frusto-conical seat 41 of the pole tip structure. Two arms 43 project laterally of the aforesaid seat 41 and include the forwardly directed portions 44 connected in diametrical relation to annulus or ring 45.

The junction of the arms 43 and tip seat 41 is apertured at 42 in alignment with all the beforementioned apertures. The formation of this aperture is such that it will not cut or fray the line 46. The inner tube (27—38) may be secured in the end closure aperture by rolling the flange (28 and 39), the tube being nested prior to closure end supporting tube mounting on the cane section.

The several inner tubes are each of an internal diameter sufficient to freely pass the bodkin. This also applies to the several node apertures as well as tip aperture 42.

The resulting structure is devoid of external line guides and the line feeds freely through the pole in either direction, if desired, and without snarling or snagging. A twelve or fourteen foot three section cane pole can be readily assembled and disassembled when desired, and in the latter condition is readily transportable in an automobile, plane and the like.

A sufficiently long pole in order to not be burdensome must be extremely light and still be sufficiently strong for fishing purposes. A cane or bamboo pole is satisfactory whereas a metal one is too heavy. Sectionalizing the pole, accordingly, facilitates the boring or rather drilling through the nodes to form the central apertures therein as illustrated, each pole section being about six or so feet in length with nodes 8 to 10 inches apart and the handle section being about twenty to twenty-four inches in length.

While the invention has been illustrated and described in great detail in the drawing and foregoing description, the same is to be considered as illustrative and not restrictive in character.

The several modifications described herein, as well as others which will readily suggest themselves to persons skilled in this art, all are considered to be within the broad scope of the invention, reference being had to the appended claims.

The invention claimed is:

1. A natural cane pole having apertured nodes to form a tubular arrangement therethrough from end to end, and a tubular tip fixture at the tip end and with a line guide ring spaced from but secured to the tubular portion of said tip fixture, the latter having a central aperture coaxial with the ring's center.

2. In a fishing pole, a line-passing tubular body having one end externally tapered, a frusto-conical base portion with a central opening therethrough at its restricted end and aligned with the tubular body and wedgingly receiving the externally tapered end of the tubular body, a line guide ring spaced from said base portion, and a plurality of arm means each extending outwardly from the restricted end of said base portion and then forwardly and connected to the ring for ring support and spacing purposes.

3. A pole section including a tubular body portion having one end externally tapered, a frusto-conical base portion with a central opening therethrough at its restricted end and wedgingly receiving the tapered end of the tubular body portion, a line guide ring spaced from the base portion, and outwardly and forwardly directed arm means extending from the restricted end of the base portion and connected to the ring, a deep cup-like member enveloping and closing the other end of the tubular body portion and secured thereto and having a central aperture in the closure portion, and elongated tubular guide means seated in the aperture and projecting from the closure portion toward the tip and axially aligned substantially with the tip opening and ring center.

4. A pole including body means of tubular character from end to end, centrally apertured guide means at the rear end of the body means and providing a line guide therein and supported by and closing the end of the tubular body means, a centrally apertured tip secured at the opposite end of the body means, an annular ring spaced from the tip and having its center registering with the pole axis, the ring aperture being aligned with the tip and guide means apertures, and arm means connecting said ring and tip for spacing the former from the centrally apertured end of the latter.

5. A pole including a body means of tubular character from end to end, elongated guide means at the rear end of the body means providing a line guide therein and supported by the tubular body means, a centrally apertured tip secured at the opposite end of the body means, an annular ring spaced from the tip and having a registering center with the pole axis, and arm means connecting said ring and tip for spacing the former from the apertured end of the latter, the body means being of sectional character and including a plurality of sections, the adjacent ends of adjacent sections having a telescopic connection, said connection also including elongated tubular guide means within one of the telescopically associated ends of the adjacent sections.

6. A natural cane pole as defined by claim 1 wherein there is a reel externally supported by the pole at the end opposite the tip fixture and having a line feeding from the reel axially into the pole tubularity at the reel end thereof, the pole, at the reel end, having a line centering and guiding portion aligned with the several node apertures between the tip fixture and reel ends thereof.

7. A natural cane pole as defined by claim 1 wherein there is a reel supported by the pole at the end opposite the tip fixture and having a line feeding axially into the pole tubularity at the reel end thereof, the pole, at that end, having a line centering and guiding portion aligned with the several node apertures, and bracket means having a reel supporting portion offset from the tubular arrangement axis for positioning the spool of the reel so that the line from said guide means is substantially tangential to the spool, said bracket means and the reel end of the pole having a detachable elongated tubular connection therebetween permitting line passage therethrough and through the guide means.

8. A pole as defined by claim 4 wherein the centrally apertured guide and end closing means includes an elongated tube receivable by the tubularity of the body means.

9. A pole as defined by claim 4 wherein the body means is of natural cane character and sectional, each section having at least one centrally apertured node therein, the sections having detachable, centrally apertured, tongue and socket connections therebetween.

10. A fishing pole including a plurality of natural cane sections, each section being of tubular body type with at least one apertured node therein and with the tubularity at one end, a deep cup-like member enveloping and closing that tubular end and rigidly secured thereto and centrally apertured, and elongated tubular guide means projecting inwardly into the tubularity and from the cup-like member at the aperture therein.

11. A tubular fishing pole including a plurality of natural cane sections, each section being a single length of natural cane with at least one centrally apertured node therein and the tubularity being at both ends, a sleeve secured to and enveloping an end of each intermediate section and projecting therefrom, a deep cup-like member secured to and enveloping the adjacent end of the adjacent section and centrally apertured for alignment with the node aperture, and nestable in the projecting end of the sleeve for telescopic connection of adjacent natural cane sections, a reel at one end of the pole, a line thereon feeding axially into the pole tubularity, and a line feeding fixture at the other end of the pole.

12. A tubular fishing pole comprising a plurality of natural cane sections, each section being of desired length and of tubular body type with at least one apertured node therein, the sections when connected end to end providing a tubular formation from end to end, and a tip fixture at one end of the pole and having wedging connection with that end, said fixture having a central aperture aligned with the tubularity and a line guide ring portion spaced from the apertured portion and having its opening aligned with the tubular formation.

13. A tubular fishing pole comprising a plurality of natural cane sections, each section being of desired length and of tubular body type with at least one apertured node therein, ferrule and sleeve means having telescopic frictional connection therebetween and connected to adjacent ends of adjacent sections for connecting the sections together into a rigid body having a tubular formation from end to end, the telescopic portions of said means being comparatively elongated relative to a transverse dimension of the pole, and an apertured tip fixture rigid with one end of the pole.

RUSSELL C. PRICE.